United States Patent
Manzur

(10) Patent No.: US 10,408,925 B1
(45) Date of Patent: Sep. 10, 2019

(54) LOW PROBABILITY OF INTERCEPT LASER RANGE FINDER

(71) Applicant: Tariq Manzur, Lincoln, RI (US)

(72) Inventor: Tariq Manzur, Lincoln, RI (US)

(73) Assignee: The United States of America as represented by the Secretary of the Navy

( * ) Notice: Subject to any disclaimer, the term of this patent is extended or adjusted under 35 U.S.C. 154(b) by 299 days.

(21) Appl. No.: 15/654,076

(22) Filed: Jul. 19, 2017

(51) Int. Cl.
| | | |
|---|---|---|
| *G01C 3/08* | (2006.01) | |
| *G01S 7/484* | (2006.01) | |
| *G01S 7/481* | (2006.01) | |
| *G01S 17/10* | (2006.01) | |

(52) U.S. Cl.
CPC ............ *G01S 7/484* (2013.01); *G01S 7/4814* (2013.01); *G01S 17/10* (2013.01)

(58) Field of Classification Search
CPC .... H04J 14/02; H01S 3/2391; H01S 3/06754; H01S 3/0085; H01S 3/1305; H01S 3/1302; H04B 10/11; H04B 10/505; H04B 10/66
USPC ........................................................ 356/4.01
See application file for complete search history.

(56) References Cited

U.S. PATENT DOCUMENTS

| | | | |
|---|---|---|---|
| 8,842,361 B1* | 9/2014 | Manzur ................. | H01S 3/1302 359/340 |
| 10,008,821 B1* | 6/2018 | Goodno ................ | H01S 3/2308 |
| 10,090,634 B1* | 10/2018 | Manzur ................... | H04J 14/02 14/2 |
| 2005/0201429 A1* | 9/2005 | Rice .................... | B23K 26/0604 372/27 |
| 2016/0291137 A1* | 10/2016 | Sakimura ................ | G01S 17/58 |

* cited by examiner

*Primary Examiner* — Mark Hellner
(74) *Attorney, Agent, or Firm* — James M. Kasischke; Michael P. Stanley

(57) ABSTRACT

A range finder includes a plurality of modulated seed lasers providing light at different wavelengths. Light from the seed lasers is provided to a wideband laser fiber amplifier. A portion of amplified laser light is directed to a first detector. The remainder is transmitted to a target through a collimating lens. Reflections from the target are received by a telescope. A major portion of the returned light is provided to a second detector. A minor portion is provided as feedback to the wideband laser fiber amplifier for stabilization. Outputs from the first and second detector are provided to a processor. Processor analyzes the time delay between the transmitted light and the reflected light to provide a range output. Other embodiments could use adaptive optics and mode hopping range calculations.

14 Claims, 2 Drawing Sheets

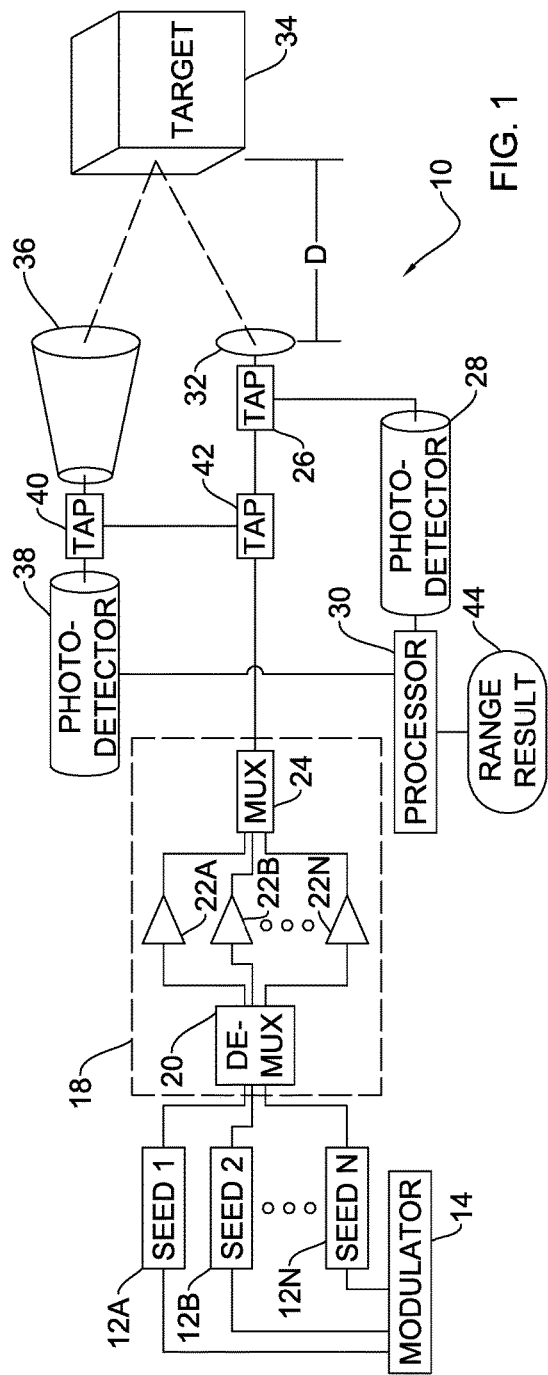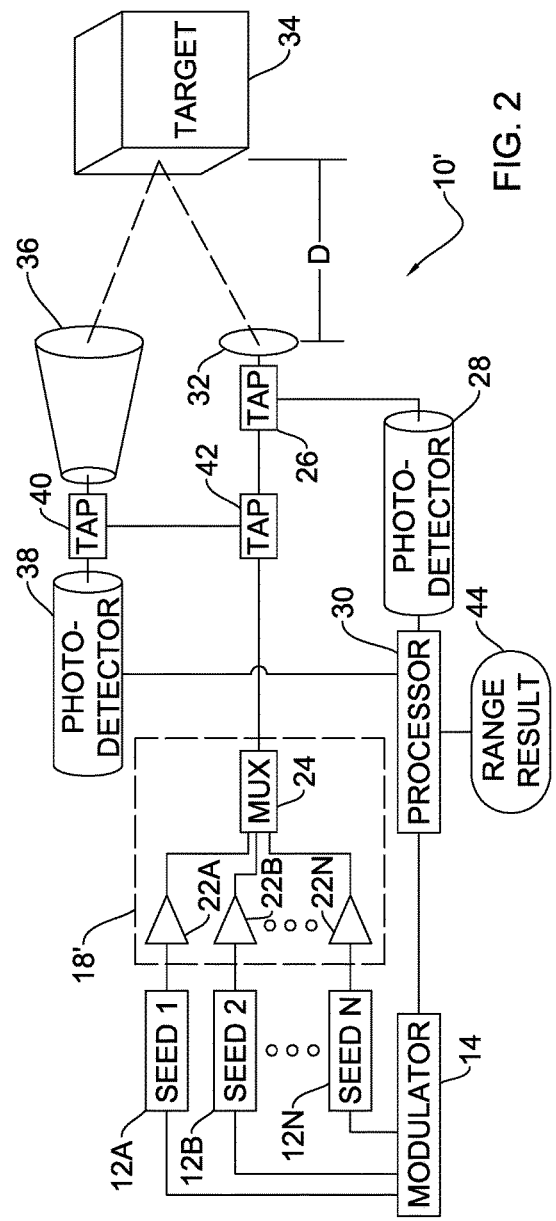

LOW PROBABILITY OF INTERCEPT LASER RANGE FINDER

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a laser range finder and more particularly to resilient multi-frequency laser range finder.

(2) Description of the Prior Art

Time of flight laser range finders are well known. Typically a laser pulse is transmitted to an object and observed by a detector. Utilizing the known speed of light, c, the time difference between pulse launch and detection is used to calculate distance. Optics such as collimating lenses and telescopic lenses increase the range. Pulse modulation is known to avoid jamming. Multiple frequency phase shift is also known to give a more accurate measurement.

Visible light range finders have problems operating in rain, fog or dust. Typically, range finders operating in these conditions get two returns, one from the fog and a second return from the target. Many range finders have a farthest mode wherein the short range return is ignored.

Laser range finders often operate on time of flight principles. Using time of flight, a range finder emits a pulse of light toward a target at a first time and receives the reflected pulse of light at a second time. Distance can be calculated by knowing the time differences and the speed of light. It is also known to provide reflected light as feedback to the laser of the range finder. This causes a beat signal in the transmitted light which can be detected in the reflected light. The frequency of the beat signal can be used to determine or refine the range between the range finder and the target.

Various means have been developed to thwart laser range finders. These methods include jamming of lasers using single frequencies, and providing surfaces that don't reflect single frequency light. Utilizing a laser, a false return can be given to a laser range finder leading to inaccurate range measurements between the source and target.

SUMMARY OF THE INVENTION

It is a first object of the present invention to provide a laser range finder that provides a robust return signal at a variety of frequencies.

Another object is to provide a laser range finder that can utilize advanced techniques to provide a more accurate range.

Yet another object is to provide a laser range finder that can be encoded as a guard against false returns.

Accordingly, there is provided a range finder that includes a plurality of modulated seed lasers providing light at different wavelengths. Light from the seed lasers is provided to a wideband laser fiber amplifier. A portion of amplified laser light is directed to a first detector. The remainder is transmitted to a target through a collimating lens. Reflections from the target are received by a telescope. A major portion of the returned light is provided to a second detector. A minor portion is provided as feedback to the wideband laser fiber amplifier for stabilization. Outputs from the first and second detector are provided to a processor. Processor analyzes the time delay between the transmitted light and the reflected light to provide a range output. Other embodiments could use adaptive optics and mode hopping range calculations.

BRIEF DESCRIPTION OF THE DRAWINGS

Reference is made to the accompanying drawings in which are shown an illustrative embodiment of the invention, wherein corresponding reference characters indicate corresponding parts, and wherein:

FIG. 1 is a diagram of a first embodiment of the invention;

FIG. 2 is a diagram of a second embodiment of the invention; and

DETAILED DESCRIPTION OF THE INVENTION

Figure 3:
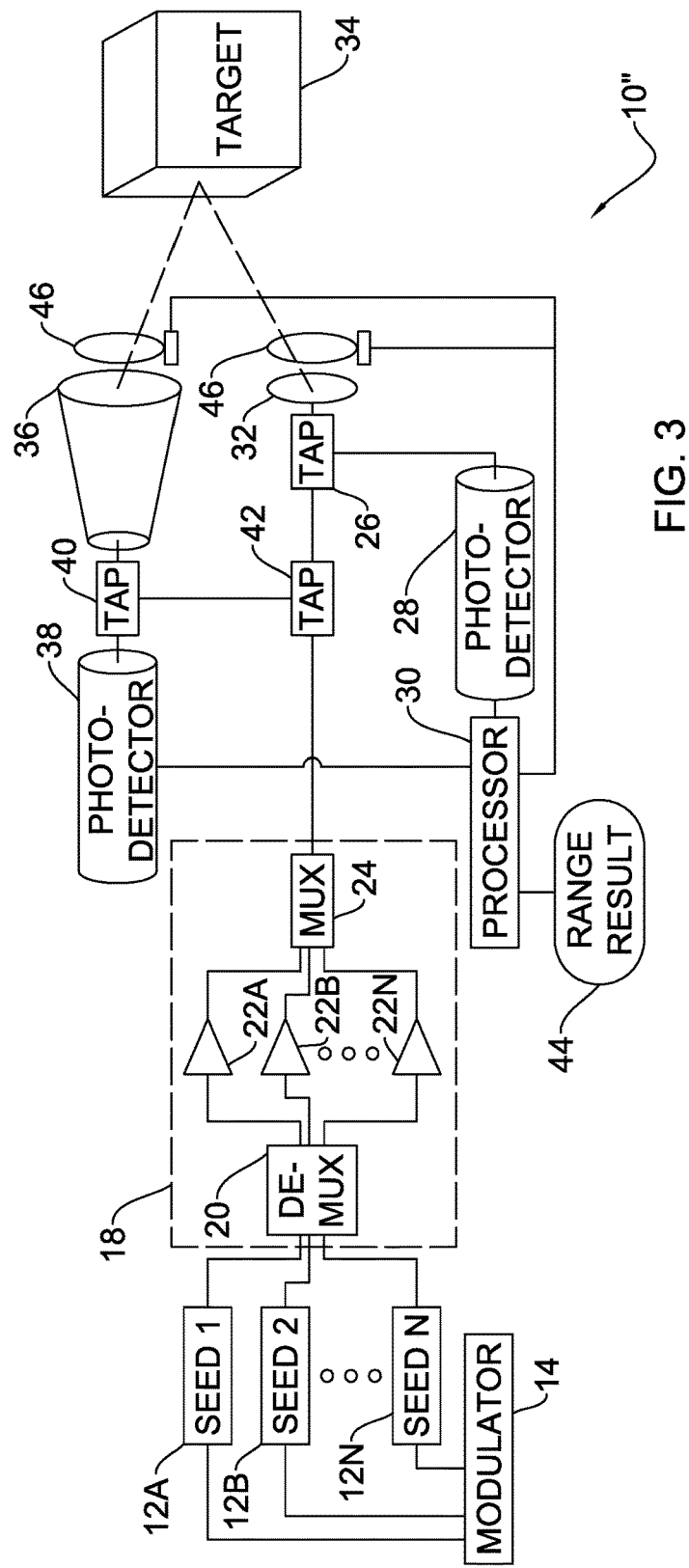
FIG. 3 is a diagram of a third embodiment of the invention.

FIG. 1 shows the range finder 10 in accordance with one embodiment. A plurality of seed lasers 12A, 12B through 12N can be utilized as laser sources. Preferably each of these seed lasers has a different frequency range; however, increased power could be obtained by having multiple lasers at the same frequency. Seed lasers 12A and 12B through 12N are joined to a controllable modulator 14. Seed lasers are preferably continuous wave solid state lasers. One modulator 14 can be provided for each laser or a single modulator can be joined to all of the lasers as shown. Modulator 14 can provide many different modulations known in the art. These include pulse modulation, pulse width modulation, frequency modulation (FM), amplitude modulation (AM), frequency shift keying (FSK), binary frequency shift keying (BFSK), phase shift keying (PSK), amplitude shift keying (ASK), quadrature amplitude modulation (QAM), code division multiple access (CDMA) and the like.

Output from seed lasers 12A, and 12B through 12N is provided to a wide band optical amplifier circuit such as that shown at 18. In circuit 18, optical input can be provided on a single input line and then demultiplexed by demultiplexer 20 into a plurality of outputs wherein each output has a different frequency range. In the current embodiment demultiplexer 20 is provided on circuit 18 described by U.S. Pat. No. 6,307,668 which is incorporated by reference herein. Demultiplexer 20 outputs are joined to an associated amplifier 22A and 22B through 22N. In the preferred embodiment each amplifier is associated with the frequency provided by one particular seed laser. For example, seed laser 12A would provide an output frequency range that is complementary to amplifier 22A. Amplifier outputs are provided to a multiplexer 24 on circuit 18 where they can be combined on to a single output line.

In an alternative embodiment, shown in FIG. 2, output from seed lasers 12A, and 12B through 12N can be provided directly to an alternative circuit 18' that doesn't have demultiplexer 20. Seed laser 12A, and 12B through 12N outputs will be provided directly to amplifiers 22A, and 22B through 22N. As before, amplifier outputs will be multiplexed by a multiplexer 24 on to a single output line.

A small portion of the output from multiplexer 24 is tapped at tap 26 to photodetector 28. Photodetector 28 is joined to processor 30 to determine the laser wavelength, pulse width, pulse repetition frequency (PRF), and launch time. In order to maximize the transmitted signal, the portion tapped should be the smallest portion that is sufficient to detect these parameters. Photodetector 28 allows comparison of signal characteristics between the transmitted signal and the return signal. This enhances the data security of the proposed system. The remainder of multiplexer 24 output is collimated by a lens 32 and transmitted through free space toward a target 34 at a range D. Output reflects off of target 34.

A telescope 36 is positioned to capture the reflected signal and focus the signal on a second photodetector 38. Telescope 36 can be collocated with the collimating lens 32 or at a known position away from the lens 32. In order to receive highly attenuated laser reflections, second photodetector 38 has highly sensitive photon counting capability. Before interaction with second photodetector 38, a portion of the reflected light is tapped by a second tap 40 and fed back into the multiplexer 24 output by third tap 42. This tapped light feeds back into the lasers 12A and 12B through 12N where the light improves stability.

Second photodetector 38 is connected to processor 30 to determine critical data concerning the detected signal. This includes time of arrival, and it may also include wavelength, pulse width, and pulse repetition frequency (PRF). Second photodetector 38 in conjunction with processor 30 may also measure wavefront and phase of the return signal to provide data from which the level of turbulence along the laser path may be quantified. It is preferable that the path length between first tap 26 and second tap 40 be known so that second photodetector 38 can compare the parameters of the same pulse as received by first photodetector 28.

Both photodetectors 28 and 38 interface with processor 30, which performs the signal processing. Processor 30 performs a continuous sweep over the photodetector 38 output to isolate and amplify the optical signals above background noise. (At extreme ranges, the signal level at photodetector 38 is likely to be comparable to that of background noise.)

FIG. 3 shows an additional embodiment 10" in which processor 30 also measures the pulse shape and pulse broadening. The analog pulses can be converted into the digital domain to facilitate comparison of the transmitted and received signals. The collected parameters allow derivation of a measurement of turbulence over the optical pathway. These defects can be corrected by providing adaptive optics 46 in conjunction with lens 32 and telescope 36 that can correct for turbulence along the free space path.

In all embodiments, the time interval between transmitted and received pulses is computed by the processor, from which the range distance is determined according to the formula $D=c\Delta t/2$, where D is the effective range, c is the speed of light in free space, and $\Delta t$ is the time interval between transmitted and received pulses. Range result D is provided as data or as visual output at 44. For accuracy in the centimeter range, pulse widths in the sub-ns range are required. Preferably, output laser pulse energy is in the range of 1-10 µJ, and the pulse repetition frequency is in the MHz range.

In one specific embodiment, seed lasers 12A and 12B through 12N are three seed lasers having output wavelengths of 1500-1560 nm, 1600-1660 nm and 1850-2200 nm. Fiber laser amplifiers 22A and 22B through 22N are three fiber laser amplifiers having output wavelengths of 1530-1560 nm, 1600-1660 nm and 1900-2200 nm respectively. Modulator 14 is a radio frequency (rf) modulator that applies pulse width modulation and pulse repetition modulation to seed laser output. Optical or acoustic modulators can be used for apply modulation as well. Seed lasers are joined to a wideband fiber laser amplifier 18 such as that disclosed in U.S. Pat. No. 6,307,668. Amplifier 18 includes demultiplexer 20, fiber laser amplifiers 22A and 22B through 22N, and multiplexer 24. Multiplexer 24 provides output to tap 26 and collimated lens 32. The remainder of the components are joined as in FIG. 1 above.

The range to the target, D, can also be determined or be made more accurate by utilizing a mode hopping technique. Collimating lens 32 and target 34 form an external cavity of length D. Light received by telescope 36 is provided as feedback to amplifier 22A, 22B and 22N and seed lasers 12A, 12B, and 12N. Feedback light triggers stimulated amplification in the internal cavity and influences the light provided to the external cavity. This influence results in discontinuities in the light power that is received at detector 38. Processor 30 can measure these discontinuities and determine a mode hopping frequency, $f_m$, that is related to the transmitted operating frequency, $f_o$. This can be used to establish a frequency deviation, $\Delta f = f_o - f_m$. The distance to the target D can then be determined as $D = Nc/2\Delta f$, where N is the number of mode hops detected.

Controlling the transmitted operating frequency, $f_o$, and measuring pulse reception times allows increased accuracy in determination of distance D. As shown in FIG. 2, processor 30 can be joined to modulator 14 for aid in coordinating transmitted operating frequencies. For example, distance D can be calculated by pulse reception and then by mode locking at several different frequencies. These measurements can then be combined by averaging or some other technique to give the best distance measurement.

The apparatus taught herein has many advantages and features above the prior art. The seed laser and amplifier construction shown herein is much more controllable than directly modulating a source laser. The lower power seed lasers are easier to tune by techniques such as thermal tuning. Minimal feedback can be used to stabilize the seed lasers. Use of amplifiers enables providing light at the chosen frequency.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed. Obviously, many modifications and variations are possible in light of the above teaching. Such modifications and variations that may be apparent to a person skilled in the art are intended to be included within the scope of this invention as defined by the accompanying claims.

What is claimed is:
1. A range finder comprising:
   a plurality of seed lasers, each capable of providing light at a different wavelength at an output of the seed laser, the seed laser outputs being joined together as a single seed output;

a modulator joined each of said plurality of seed lasers for modulating the provided light from each seed laser in a preselected scheme;

a demultiplexer joined to the single seed output for distributing light therefrom to a plurality of demultiplexer outputs;

a plurality of laser fiber amplifiers, each joined to one said demultiplexer output for receiving light at a particular wavelength and amplifying the received light at an amplifier output;

a multiplexer joined to said plurality of laser fiber amplifier outputs and capable of combining the provided light at a multiplexer output;

a first tap joined to the multiplexer output and having a main output and a monitoring output;

a collimating lens joined to said first tap main output and capable of transmitting collimated light along a target vector;

a first detector joined to said first tap monitoring output and capable of providing a first detector output in response to light transmitted from said first tap monitoring output;

a telescope capable of receiving reflected light from the target vector and providing focused light;

a second tap joined to the telescope and having a detector output;

a second detector joined to said second tap detector output and capable of providing a second detector output in response to light transmitted from said second tap detector output; and a processor joined to receive said first detector output and said second detector output and to utilize the modulator preselected scheme to compute and provide a range result therefrom.

2. The apparatus of claim 1 wherein said processor compares the first detector output with the second detector output to confirm source origin.

3. The apparatus of claim 1 wherein:

said second tap has a stabilizing output; and further comprising a third tap joined to said second tap stabilizing output and to said multiplexer for transmitting light from said stabilizing output to said plurality of laser fiber amplifiers, said third tap allowing unimpeded transmission of light from said multiplexer output to said first tap.

4. The apparatus of claim 3 wherein said processor utilizes light power from said second detector output to determine the distance to the target by analyzing mode hopping.

5. The apparatus of claim 1 wherein said collimating lens and said telescope are collocated.

6. The apparatus of claim 1 wherein said processor compares said second detector output with said first detector output to measure turbulence in the environment affecting collimated light along the target vector transmitted by said collimating lens and reflected light received by said telescope.

7. The apparatus of claim 6 wherein:

one of said collimating lens, said telescope, and both said collimating lens and said telescope are made with adaptive optics for countering turbulence in the environment; and said processor includes an adaptive optics control output joined to components made with adaptive optics.

8. A range finder comprising:

a plurality of seed lasers, each capable of providing light at a different wavelength at an output of the seed laser;

a modulator joined each of said plurality of seed lasers for modulating the provided light from each seed laser in a preselected scheme;

a plurality of laser fiber amplifiers, each joined to one seed laser output for receiving light at a particular wavelength and amplifying the received light at an amplifier output;

a multiplexer joined to said plurality of laser fiber amplifier outputs and capable of combining the provided light at a multiplexer output;

a first tap joined to the multiplexer output and having a main output and a monitoring output;

a collimating lens joined to said first tap main output and capable of transmitting collimated light along a target vector;

a first detector joined to said first tap monitoring output and capable of providing a first detector output in response to light transmitted from said first tap monitoring output;

a telescope capable of receiving reflected light from the target vector and providing focused light;

a second tap joined to the telescope and having a detector output;

a second detector joined to said second tap detector output and capable of providing a second detector output in response to light transmitted from said second tap detector output; and a processor joined to receive said first detector output and said second detector output and to utilize the modulator preselected scheme to compute and provide a range result therefrom.

9. The apparatus of claim 8 wherein said processor compares the first detector output with the second detector output to confirm source origin.

10. The apparatus of claim 8 wherein:

said second tap has a stabilizing output; and further comprising a third tap joined to said second tap stabilizing output and to said multiplexer for transmitting light from said stabilizing output to said plurality of laser fiber amplifiers, said third tap allowing unimpeded transmission of light from said multiplexer output to said first tap.

11. The apparatus of claim 10 wherein said processor utilizes light power from said second detector output to determine the distance to the target by analyzing mode hopping.

12. The apparatus of claim 8 wherein said collimating lens and said telescope are collocated.

13. The apparatus of claim 8 wherein said processor compares said second detector output with said first detector output to measure turbulence in the environment affecting collimated light along the target vector transmitted by said collimating lens and reflected light received by said telescope.

14. The apparatus of claim 13 wherein:

one of said collimating lens, said telescope, and both said collimating lens and said telescope are made with adaptive optics for countering turbulence in the environment; and said processor includes an adaptive optics control output joined to components made with adaptive optics.

\* \* \* \* \*